(12) United States Patent
Lundberg et al.

(10) Patent No.: US 12,067,213 B2
(45) Date of Patent: Aug. 20, 2024

(54) STRUCTURED TEXT FOR ELECTRONIC COMMUNICATIONS

(71) Applicant: Black Hills IP Holdings, LLC, Minneapolis, MN (US)

(72) Inventors: Steven W. Lundberg, Edina, MN (US); Thomas G. Marlow, Cape Elizabeth, ME (US); Christopher James Kinniburgh, Minneapolis, MN (US)

(73) Assignee: Black Hills IP Holdings, LLC, Minneapolis, MN (US)

( * ) Notice: Subject to any disclaimer, the term of this patent is extended or adjusted under 35 U.S.C. 154(b) by 0 days.

(21) Appl. No.: 17/097,233

(22) Filed: Nov. 13, 2020

(65) Prior Publication Data

US 2021/0152504 A1    May 20, 2021

Related U.S. Application Data

(60) Provisional application No. 62/935,566, filed on Nov. 14, 2019.

(51) Int. Cl.
*G06F 3/0482* (2013.01)
*G06F 3/0486* (2013.01)
(Continued)

(52) U.S. Cl.
CPC .......... *G06F 3/0482* (2013.01); *G06F 3/0486* (2013.01); *G06F 16/2358* (2019.01);
(Continued)

(58) Field of Classification Search
CPC .... G06F 16/93; G06F 16/2358; G06F 3/0482; G06F 3/0486; G06F 16/24573;
(Continued)

(56) References Cited

U.S. PATENT DOCUMENTS

| | | | |
|---|---|---|---|
| 6,332,156 B1 * | 12/2001 | Cho | ........................ H04L 51/18 |
| | | | 709/206 |
| 7,774,408 B2 * | 8/2010 | Sinha | ................... G06Q 10/107 |
| | | | 709/206 |

(Continued)

OTHER PUBLICATIONS

C. Valle, W. Prinz and M. Jarke, "Using Tasks and Semi-structured Messages to Support Decision Follow Up," 2006 International Conference on Collaborative Computing: Networking, Applications and Worksharing, Atlanta, GA, USA, 2006, pp. 1-10, doi: 10.1109/COLCOM.2006.361866. (Year: 2006).*

(Continued)

*Primary Examiner* — Andrew L Tank
(74) *Attorney, Agent, or Firm* — Schwegman Lundberg & Woessner, P.A.

(57) ABSTRACT

Various aspects disclosed relate to a method of creating a manifest record for an outgoing electronic communication. The method includes identifying at least one document to be sent with the outgoing electronic communication, receiving a message comprising unstructured text to be inserted into the outgoing electronic communication, generating a manifest record for attachment to the outgoing electronic communication, attaching the at least one document and the manifest record to the outgoing electronic communication, and sending the outgoing electronic communication with the document and the manifest record attached. The manifest record includes structured data specifying the document type and the message type, wherein generating the manifest record includes assigning the message type associated with the message and the document type associated with the at least one document to the manifest record.

22 Claims, 13 Drawing Sheets

(51) Int. Cl.
*G06F 16/23* (2019.01)
*G06F 16/93* (2019.01)
*G06Q 10/0631* (2023.01)
*H04L 51/046* (2022.01)
*H04L 51/08* (2022.01)
*H04L 51/18* (2022.01)
*H04L 51/42* (2022.01)

(52) U.S. Cl.
CPC ......... *G06F 16/93* (2019.01); *G06Q 10/0631* (2013.01); *G06Q 10/06311* (2013.01); *H04L 51/046* (2013.01); *H04L 51/08* (2013.01); *H04L 51/18* (2013.01); *H04L 51/42* (2022.05)

(58) Field of Classification Search
CPC ................ G06F 16/23; G06Q 10/0631; G06Q 10/06311; G06Q 10/10; G06Q 10/107; G06Q 50/18; G06Q 10/103; H04L 51/22; H04L 51/046; H04L 51/08; H04L 51/18; H04L 51/42; G06K 9/00442
See application file for complete search history.

(56) References Cited

U.S. PATENT DOCUMENTS

| | | | | |
|---|---|---|---|---|
| 8,862,981 | B2* | 10/2014 | Margitich | G06Q 10/107 |
| | | | | 715/221 |
| 8,914,450 | B1* | 12/2014 | Buchheit | H04L 67/06 |
| | | | | 709/206 |
| 9,652,536 | B1* | 5/2017 | Stasior | G06F 16/951 |
| 11,847,301 | B2 | 12/2023 | Lundberg et al. | |
| 2002/0138582 | A1* | 9/2002 | Chandra | G06Q 10/107 |
| | | | | 709/206 |
| 2002/0178229 | A1* | 11/2002 | Sinha | G06Q 10/10 |
| | | | | 709/206 |
| 2003/0135659 | A1 | 7/2003 | Bellotti et al. | |
| 2004/0054744 | A1* | 3/2004 | Karamchedu | G05B 19/00 |
| | | | | 709/206 |
| 2005/0021639 | A1* | 1/2005 | Wang | G06Q 10/107 |
| | | | | 709/206 |
| 2006/0129592 | A1 | 6/2006 | Poozhiyil et al. | |
| 2007/0150521 | A1* | 6/2007 | Vedula | G06F 16/2308 |
| 2007/0168430 | A1 | 7/2007 | Brun et al. | |
| 2008/0250474 | A1 | 10/2008 | Bhogal et al. | |
| 2008/0270543 | A1* | 10/2008 | Bhamidipaty | G06Q 10/107 |
| | | | | 709/206 |
| 2009/0157820 | A1* | 6/2009 | Sampang | G06F 40/169 |
| | | | | 709/206 |
| 2011/0119102 | A1* | 5/2011 | Horn | G06Q 10/06 |
| | | | | 709/206 |
| 2011/0179362 | A1* | 7/2011 | Craddock | H04L 51/08 |
| | | | | 715/752 |
| 2011/0185024 | A1* | 7/2011 | Ramarao | H04L 51/08 |
| | | | | 709/206 |
| 2012/0124143 | A1* | 5/2012 | Chung | G06Q 10/107 |
| | | | | 709/206 |
| 2012/0203783 | A1* | 8/2012 | Dreyfus | H04L 51/00 |
| | | | | 707/E17.089 |
| 2012/0290945 | A1* | 11/2012 | Byrne | G06F 3/04842 |
| | | | | 715/752 |
| 2014/0019567 | A1 | 1/2014 | Chen et al. | |
| 2014/0181223 | A1* | 6/2014 | Homsany | H04L 51/08 |
| | | | | 709/206 |
| 2015/0032827 | A1* | 1/2015 | Tyler | H04L 51/216 |
| | | | | 709/206 |
| 2016/0342571 | A1* | 11/2016 | Lane | H04W 4/18 |
| 2019/0364003 | A1* | 11/2019 | Sachdeva | G06F 40/289 |
| 2020/0097911 | A1 | 3/2020 | Padmanaban et al. | |
| 2020/0296067 | A1* | 9/2020 | Lee | G06Q 10/00 |
| 2021/0152509 | A1 | 5/2021 | Lundberg et al. | |
| 2021/0165797 | A1* | 6/2021 | Shek | G06F 16/24573 |

OTHER PUBLICATIONS

U.S. Appl. No. 17/097,245, filed Nov. 13, 2020, Structured Text for Electronic Communications.
U.S. Appl. No. 17/097,233, Response filed Mar. 17, 2022 to Non Final Office Action mailed Dec. 24, 2021, 10 pgs.
U.S. Appl. No. 17/097,245, Final Office Action mailed Jul. 14, 2022, 10 pgs.
U.S. Appl. No. 17/097,245, Non Final Office Action mailed Dec. 24, 2021, 8 pgs.
U.S. Appl. No. 17/097,245, Response filed Oct. 14, 2022 to Final Office Action mailed Jul. 14, 2022, 8 pgs.
U.S. Appl. No. 17/097,245, Non Final Office Action mailed Jan. 20, 2023, 9 pgs.
U.S. Appl. No. 17/097,245, Response filed Apr. 20, 2023 to Non Final Office Action mailed Jan. 20, 2023, 8 pgs.
U.S. Appl. No. 17/097,245, Notice of Allowance mailed Aug. 8, 2023, 5 pgs.

* cited by examiner

YOUR EMAIL ANNOTATION ⓘ

```
* The following information is meant for BHIP use only.
STARTBHIPFAFORMAT[0.2]
filename,doc_title,type,mailed_date,due_date,inst_due_date,cust_code,app_no,docket_no,country,filing_date,status
"Email","email"," "," "," "," "," ","undefined","undefined"," ","undefined"
c4b4b64147848160454567 7bbb952279
ENDBHIPFAFORMAT[0.2]
```

*FIG. 2A*

```
* The following information is meant for BHIP use only.
[STARTBHIPFAFORMAT[0.2]
filename,doc_title,type,mailed_date,due_date,inst_due_date,cust_code,app_no,docket_no,country,filing_date,status
"Email","email","","","","","undefined","undefined","undefined","undefined","undefined"
cf0ab6414748e16045d5677bb0952279
[ENDBHIPFAFORMAT[0.2]
```

FIG. 2B

DOCKETING ASSISTANT

TO ENSURE PROCESS EFFICIENCY AND DATA ACCURACY, PLEASE FILL OUT THE INFORMATION BELOW, THEN CLICK 'COPY TO CLIPBOARD' IN THE 'YOUR EMAIL ANNOTATION' SECTION. PASTE THE CONTENTS INTO AN EMAIL WITH A COPY OF THE DOCUMENT. THIS CODE IS NOT INTENDED TO REPLACE STANDARD EMAIL REPORTING, WHICH MAY BE PROVIDED ABOVE THE CODD OR IN AN ATTACHMENT

APP NO ⓘ
DOCKET NO. ⓘ
COUNTRY
FILING DATE ⓘ  [SELECT DATE]
STATUS ⓘ

| FILENAME | REPORTING TYPE ⓘ | REPORTING DETAIL ⓘ | MAILED DATE ⓘ | DUE DATE ⓘ | INSTRUCTIONS DUE DATE ⓘ |
|---|---|---|---|---|---|
| EMAIL | EMAIL ˅ | EMAIL ˅ | SELECT DATE | SELECT DATE | SELECT DATE |

FROM PTO ⓘ | SENT TO PTO ⓘ | AGENT LETTER ⓘ | PRIOR ART ⓘ | OTHER ⓘ
DROP FILES HERE, OR [SELECT FILE]  (×5)

FOR EACH FILE YOU INTEND TO REPORT OUT, PLEASE CHOOSE THE APPROPRIATE CATEGORY BOX BELOW. PLEASE DROP EACH FILE ONTO THE CORRECT BOX, OR SELECT THE FILE USING THE APPROPRIATE 'SELECT FILE' BUTTON. NOTE: THIS WILL NOT UPLOAD THE FILE, ONLY STORE ITS NAME

*FIG. 10*

STRUCTURED TEXT FOR ELECTRONIC COMMUNICATIONS

CLAIM OF PRIORITY

This application claims the benefit of priority under 35 U.S.C. § 119(e) to U.S. Patent Application Ser. No. 62/935,566, filed on Nov. 14, 2019, which is incorporated by reference herein in its entirety.

TECHNICAL FIELD

The application is directed to electronic communications, and more specifically to structured text for e-mail communications.

BACKGROUND

Electronic communication, such as e-mail or SMS text messaging, is ubiquitously used throughout business and personal functions on a daily basis to communicate about various events, tasks, due dates, and other information. Electronic communication functions across computer networks, including the internet, such that users all over the globe may communicate instantly.

Each user of electronic communication uses a different computing program and user interface for electronic communication. Moreover, the text in the body of electronic communication is free form, and often unstructured. For this reason, a received electronic communication typically must be read by a human user and interpreted before any function or action is subsequently taken based on the contents of the electronic communication.

SUMMARY

The systems and methods described herein address the needs in the art by providing methods of creating structured text for inclusion in electronic communications to enable automated, computer executed actions based on the information in that structured text, without need for additional human interpretation of the structured text.

Discussed herein is a manifest record generating program. A manifest record may include structured text describing certain qualities of an electronic communication, such as the type of message, type of attached documents, and associated deadlines. The structured text may be read by a computing program and induce automated actions and/or responses to the manifest record in a computing system, such as an update to file databases, notifications of required responses, or updated deadlines.

In a first aspect, a method of creating a manifest record for an outgoing electronic communication includes receiving a message having unstructured text to be inserted into the outgoing electronic communication, generating a manifest record for attachment to the outgoing electronic communication, the manifest record including structured data specifying a message type, wherein generating the manifest record comprises assigning the message type associated with the message, attaching the manifest record to the outgoing electronic communication, and sending the outgoing electronic communication with the manifest record.

In a second aspect, a method includes receiving an electronic communication having unstructured text in a body of the electronic communication, and a manifest record that specifies a message type associated with the electronic communication, saving a copy of the manifest record, reading the manifest record to determine the message type, and executing an action in an electronic system automatically based on the manifest record.

In a third aspect, a non-transitory computer-readable medium stores instructions that when executed by one or more processors cause the one or more processors to perform operations including receiving a message including unstructured text to be inserted into an outgoing electronic communication, generating a manifest record for attachment to the outgoing electronic communication, the manifest record including structured data specifying a message type, wherein generating the manifest record comprises assigning the message type associated with the message to the manifest record, attaching the manifest record to the outgoing electronic communication, and sending the outgoing electronic communication with the manifest record attached.

In a fourth aspect, a non-transitory computer-readable medium stores instructions that when executed by one or more processors cause the one or more processors to perform operations including receiving an electronic communication having unstructured text in a body of the electronic communication and a manifest record specifying a message type associated with the electronic communication, saving a copy of the manifest record, reading the manifest record to determine the message type, and executing an action in an electronic system automatically based on the manifest record.

In a fifth aspect, a system includes a manifest record creation system that creates a manifest record including structured text describing an action to be executed by a computing machine upon receipt of an associated electronic communication, and an electronic communication system that produces an electronic communication, attaches the manifest record to the electronic communication, and sends the electronic communication to a recipient.

In a sixth aspect, a system includes an electronic communication system that receives an electronic communication with manifest record attached, the manifest record including structured text describing an action to be taken upon receipt of the electronic communication, and an automated docketing system that interprets the structured text in the manifest record and executes the action.

In some embodiments, the disclosed method provides a mechanism to allow execution of automated actions in an electronic system based on structured text included with an electronic communication.

In some embodiments, the disclosed method provides a mechanism for an electronic communication user to produce structured text to include with their electronic communication, regardless of the server, application, program, or user interface from which the electronic communication originates.

In some embodiments, the disclosed method provides a mechanism for an electronic communication user to receive an electronic communication including structured text and to automatically execute an action in an electronic system based on the structured text.

BRIEF DESCRIPTION OF THE DRAWINGS

The present disclosure is illustrated by way of example and not limitation in the figures of the accompanying drawings, in which like references indicate similar elements and in which:

FIGS. 2A-2B depict diagrams of a manifest record and associated electronic message.

FIG. 10 is a schematic of a user interface for any of the manifest record generating programs of FIGS. 3-9 in various embodiments.

DESCRIPTION

Figure 1:
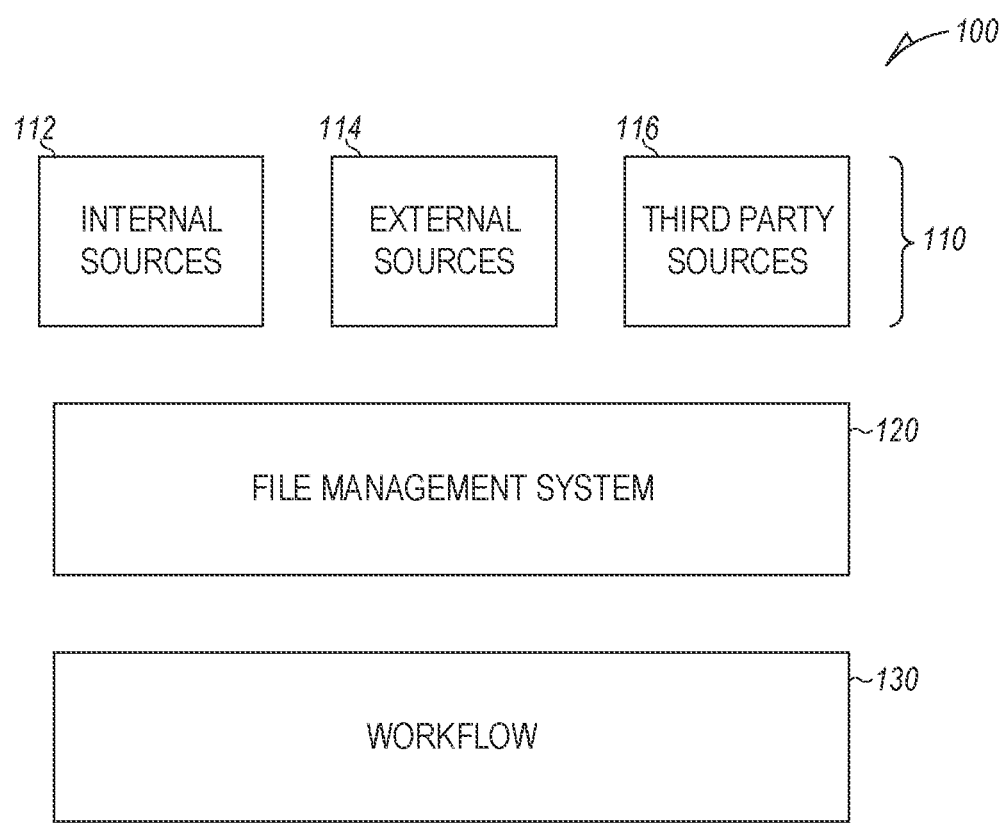
FIG. 1 is a block diagram depicting a file management system.

The following description with respect to FIGS. 1-11 sufficiently illustrates specific embodiments to enable those skilled in the art to practice them. Other embodiments may incorporate structural, logical, process, and other changes. Portions and features of some embodiments may be included in, or substituted for, those of other embodiments. Embodiments set forth in the claims encompass all available equivalents of those claims.

Terminology

As used herein, "electronic communication" refers to an electronic message or a method of exchanging messages between people using electronic devices.

As used herein, "unstructured text" or "unstructured data" refers to data that is not organized in a standard format, for example, text in the body of an electronic communication.

As used herein, "structured text" or "structured data" refers to data that is organized in a standard format such that a recipient may read the data and institute an automated computing system action without human interpretation of the data.

As used herein, "manifest record" refers to structured electronic text or data that is in a standardized format and readable using electronic means and that identifies the content of an associated electronic communication.

Overview

Electronic communication is used extensively to communicate, often with included attachments, such as documents. The body of electronic communication messages generally includes unstructured text or data. To discern the electronic communication message purpose and type of attachment, a human user typically must read the unstructured text or data within the e-mail.

The use of unstructured text or data in e-mails prevents automated actions based on the incoming electronic communication. For example, a computer executed action or software program may respond to the incoming e-mail only after the unstructured text is interpreted.

In contrast, if structured data, such as an annotation or manifest record, is included with the electronic communication, an action may be automatically executed based on the structured data in the manifest record.

Disclosed herein, in various embodiments, is a manifest record generating program and a method of creating structured data ("manifest records") for attachment to electronic communication in coordination with at least one document. The program has at least two information fields, one for categorizing the type of message being sent in the electronic communication; the other for categorizing the type of document being attached to the electronic communication. The manifest record generating program may be locally run and save manifest records to a local security environment.

In some embodiments, when the manifest record generating program is used, it generates structured data based on the two information fields, and optionally additional fields. The structured data may be attached to or included in the message of the electronic communication so that the recipient of the electronic communication may read the structured data and automate electronic communication (and attached document) sorting, docketing, or other business purposes, without requiring a human to read the unstructured data in the electronic communication body.

The manifest record generating program may optionally aggregate manifest records and review previous manifest records for a particular file/project upon the creation of a new manifest record. This allows the manifest record generating program to predict what manifest record should be generated next.

Document Management System

FIG. 1 is a block diagram depicting a manifest record creation system 100 for creating one or more manifest records. Manifest record creation system 100 may include work sources 110, file management system 120, and workflow 130. Work sources may include internal sources 112, external organization sources 114, and/or third-party sources 116.

In an office or company handling large number of projects, the company often relies on some sort of document management system. The document management system may coordinate incoming data and/or documents through a file management system 120 to indicate to the office what workflow (e.g., tasks, responses, or specific steps) may need to occur in response to those documents and/or data in a given project.

For example, the office may be working on a particular "Project A" which involves the office working back and forth with an external organization for a particular work product. For "Project A," there may be a series of deadlines that must be met by the office while interacting with the external organization. These may include, for example, response deadlines, due dates for documents, required meetings or discussions, and other tasks or items related to Project A.

The series of deadlines in Project A may be provided to the office by the external organization in documents and/or communications sent from the external organization to the office. Alternatively, the office itself may internally provide documents and/or communications with deadlines or tasks. Additionally, third parties may provide documents and/or communications with deadlines or tasks related to Project A. To track these deadlines for Project A, and any associated documents or files, the office may use manifest record creation system 100.

Manifest record creation system 100 may intake incoming documents and data from work sources 110 from the external organization, internally, or from third parties, into a file management system 120, and produce a workflow 130 for the office.

Incoming sources of data and documents may include internal sources 112, external organization sources 114, and third-party sources 116. Internal sources 112 of data and documents may include, for example, employee created deadlines or meeting dates, or reminders for upcoming deadlines associated with the external organization.

External organization sources 114 may include, for example, communications from the external organization, such as incoming e-mail messages, paper mail, or phone calls. The external organization sources 114 may potentially include documents associated with the Project A, such as written documents or spreadsheets with relevant information. The external organization sources 114 may potentially include deadlines or due dates for response to the external organization.

Third-party sources 116 may include, for example, communications from a third-party business or organization working in conjunction with the office on Project A. For example, the third-party may be a foreign office working on parts of Project A relevant to their residency. Third-party sources 116 of incoming information may include communications such as telephone calls, paper mail, e-mail, or other forms of communication. Like the other sources of information, third-party sources 116 may potentially include documents and/or deadlines and due dates for response to the third party and/or the external organization.

The file management system 120 may receive data and documents from any and/or all of these sources 112, 114, 116. Incoming sources of data and documents may induce one or more actions that may be taken within the office. File management system 120 may be a partially or wholly automated system for synthesizing incoming data and documents. File management system 120 may receive and analyze incoming documents or data from sources 112, 114, 116.

Based on the information from those sources, file management system 120 may produce a task list, a calendar of deadlines, and/or a system of reminders encompassed in workflow 130. The file management system 120 may synthesize the incoming data and documents, and associated actions to produce workflow 130, which may indicate to the office what should be done in Project A and by which due date(s).

The workflow 130 may, for example, be a list, calendar, or other tracking system showing tasks and deadlines associated with Project A. For example, if a document including a response deadline is received from the external organization (e.g., source 114) to file management system 120, the file management system 120 may recognize the response deadline and add it to workflow 130.

In this case, manifest record creation system 100 may allow for tracking and upkeep of a large number of projects, and their associated deadlines, documents, and tasks for an office. Where file management system 120 is automated, the file management system 120 may operate more efficiently than partially or non-automated systems.

Manifest Record

In manifest record creation system 100, structured text may allow for automated management of incoming data from various sources. Structured text may include data that may be interpreted by a computing program (e.g., an automated filing system), such that the computing program may execute one or more actions based on the data in the structured text. For example, the computing program may interpret the structured text and identify the associated project, file away associated documents, and/or schedule a deadline based on that structured text.

An example of structured text may include a "manifest record," designed to describe facts associated with an incoming document. FIG. 2A is an example of a manifest record 200 created by a manifest record generating program, such as the manifest record generating program as described in reference to FIG. 3 below.

Manifest record 200 may include structured text 202 that indicates various properties of an associated message (e.g., an e-mail, text message, or other electronic communication). In FIG. 2B, structured text 202 includes text describing the type of message, the type of document attached to the electronic communication, and the upcoming deadline associated with that message. Manifest record 200 may be text that is embedded in an electronic communication or attached to it.

Manifest record 200 may include structure text describing a project name or file number, the type of message, the type of document(s) attached or including with the message, deadlines that require response or action, and other information specific to the message. Manifest record 200 structured text may be read by a computing program, such as an automated file management system, to allow creation of tasks or a workflow without interpretation of unstructured text in the body of the electronic communication.

FIG. 2B shows a diagram of an example electronic communication with an embedded manifest record 200. In some examples, the electronic communication may be an e-mail, a text message, or other type of message. In FIG. 2B, the communication is e-mail 250. E-mail 250 includes recipient fields 252, 254, title field 256, message body field 258 and manifest record 200. The fields 252, 254, 256, 258, may be filled out as normal. In some cases, relevant documents may be attached to the e-mail.

In some examples, the manifest record 200 may be attached to the e-mail instead of embedded. In this case, the manifest record 200 may take the form of a spreadsheet, a comma separate values (CSV) format file, or other appropriate attachment format.

Whether the manifest record 200 is embedded in the message body field 258 or attached, the manifest record 200 may contain structured data indicating to the recipient what the message is about, which file the message is associated with, what the nature of any attached documents are, and whether there are any upcoming due dates associated with the electronic communication.

Figure 2C:
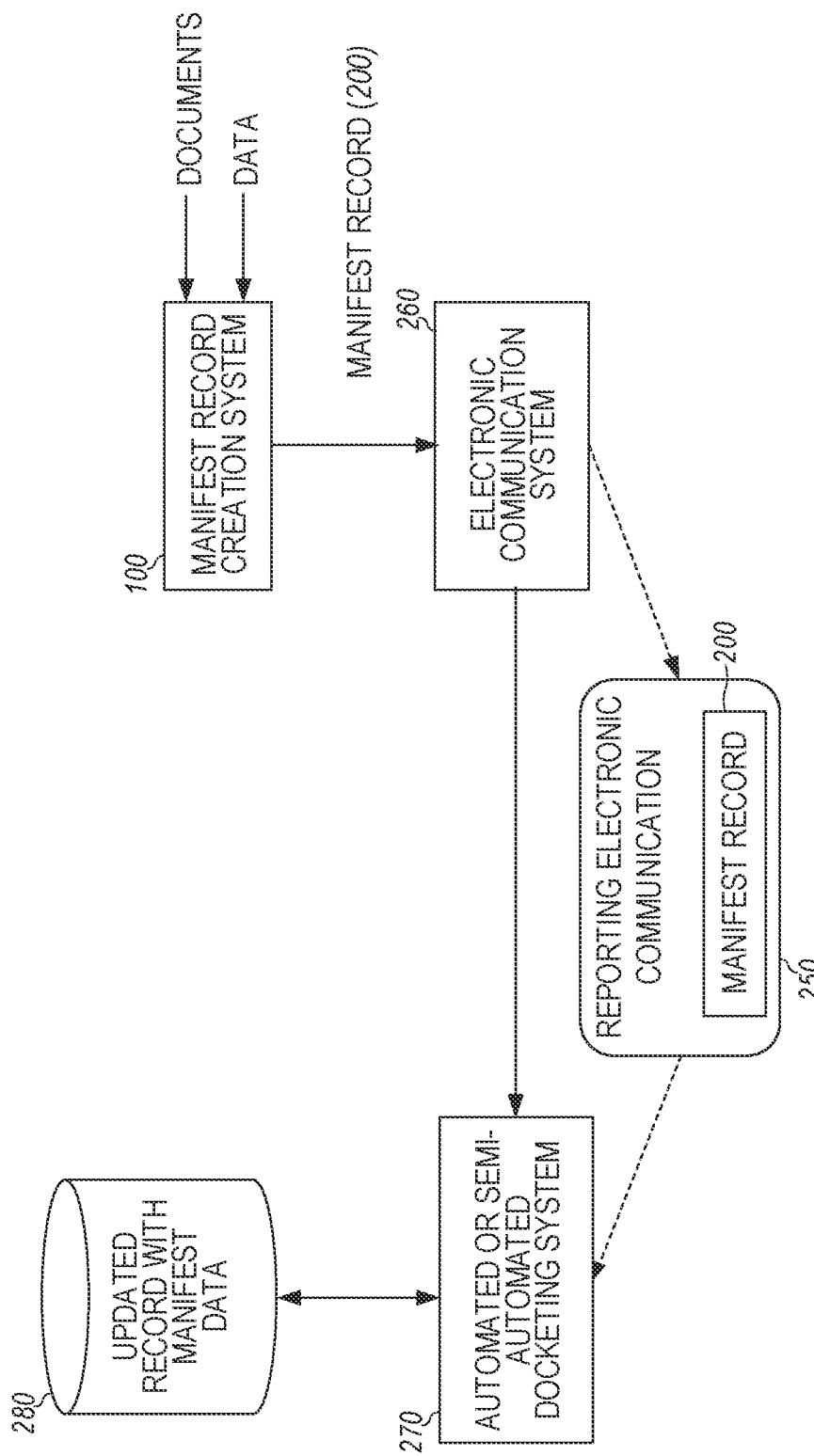
FIG. 2C depicts a schematic diagram of an electronic communication system sending manifest records to a docketing system.

FIG. 2C depicts manifest record creation system 100 working with an electronic communication system 260 to create an electronic communication 250 with a manifest record 200, and send that communication to a docketing system 270, which in turn updates a file in a database 280.

In FIG. 2C, the manifest record creation system 100 may work as discussed above with reference to FIGS. 1, 2A, and 2B. Manifest record creation system 100 may intake documents and data and create a manifest record 200 that may be incorporated into an electronic communication 250 in conjunction with an electronic communication system 260, such as an e-mail server. Manifest record 200 may include structured data regarding the documents and data taken in by manifest record creation system 100.

The electronic communication system 260 may send the produced electronic communication 250 with attached manifest record 200 to a project management system such as docketing system 270. Docketing system 270 may be automated or partially automated. In general, docketing system 270 may receive and interpret incoming documents, communications, and data. Docketing system 270 may read and review these incoming items and update a specific project file accordingly.

Here, where electronic communication system 260 sends an electronic communication 250 with an attached manifest record 200, the docketing system 270 may receive and interpret the manifest record 200. Because manifest record 200 has structured text describing the message type, document type, and/or associated deadlines, the automated (or partially automated) docketing system 270 may interpret that structured text automatically. Based on the information described in the structured text, the docketing system may, for example, update the project file with a new upcoming deadline.

Manifest Record Generating Program

The examples of FIGS. 3 to 10 discuss the use of a manifest record generating program in the context of a law firm docketing system. However, alternative uses of the manifest record generating program are envisioned, such as use in tracking sales and marketing projects, financial analysis, engineering developments, mergers and acquisitions, litigation cases, general law practice, and a variety of other applications.

Figure 3:
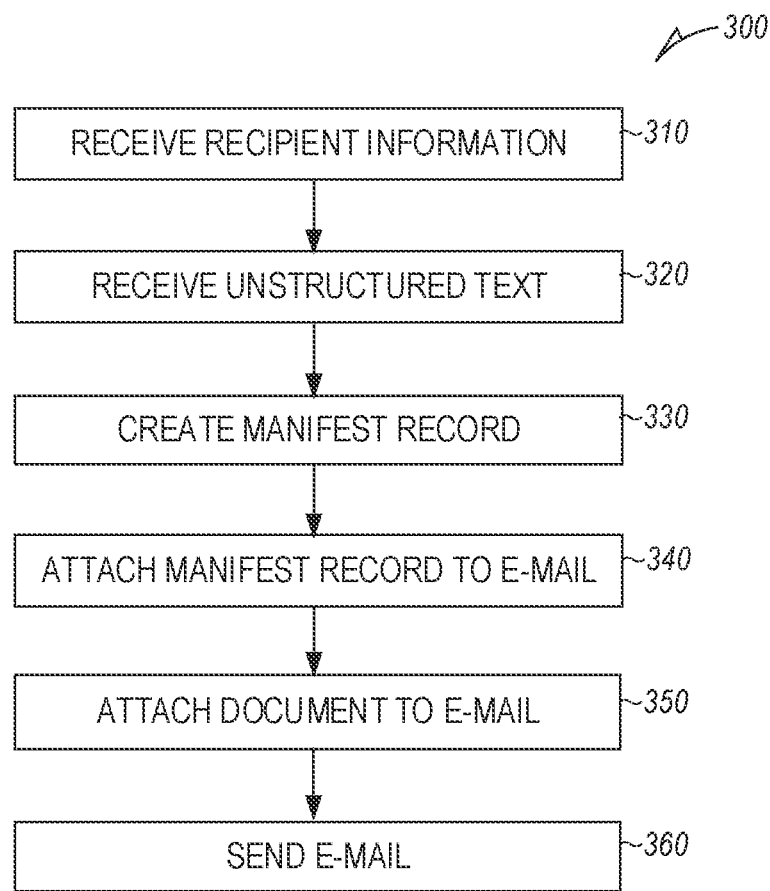
FIG. 3 is a flow chart of a manifest record generating program creating a manifest record in various embodiments.

FIG. 3 is a flow chart of an example manifest record generating program that implements a method 300 for creating a manifest record. In method 300, a manifest record generating program (e.g. manifest record creation system 100 discussed with reference to FIGS. 1 and 2A-2C) may create a manifest record 200 for sending with an electronic communication 250 through an electronic communication system 260.

Method 300 may be used, for example, in the context of a patent law docketing system. In such a docketing system, a large volume of patent cases may be open simultaneously. Each case has its own set of due and/or response dates for particular tasks that should be accomplished by the patent law office. Because each case is generally opened on differing dates, the due and/or response dates for each case also differ, creating a complex number of due and/or response dates to track in a law firm setting. Thus, a docketing system may be used to track the relevant dates and associated tasks.

For example, each case filed with the U.S. Patent Office (USPTO) or a foreign patent office has a list of due dates for action that should not be missed, such as priority dates, filing dates, responses to office action or search reports, due dates for the paying of maintenance fees, and a plethora of other types of response dates.

In general, messages associated with a particular patent case also have a specific purpose. For example, the message could be reporting that a patent application was filed on a particular date, or requesting instructions from the attorney who drafted the patent. In other cases, the messages may be received directly from a patent office responding to a patent filing.

Additionally, many electronic communications regarding patent cases require response or action on the part of the law firm receiving those communications. For example, a law firm could receive a communication from the USPTO indicating an office action was issued in the patent case from the examiner, include the attached document, and require a response within a 6-month timeline, with various shorter deadlines built into that 6-month timeframe.

A docketing system receiving such an electronic communication would be required to receive the message, interpret the subject of the message (an office action), and associate the deadline (6 months), recording a task (the response) that needed to accomplished by that deadline.

In the past, a user would be required to read unstructured text in the body of the electronic communication to gather these pieces of information, and manually enter them into a docket (e.g., a calendar of events for the patent case).

With method 300, structured text, such as a produced manifest record, may allow a computing program to receive the electronic communication and automatically identify the subject of the message, deadline, and associated task. The computing program could automatically docket the require response and deadline based on this information without requiring manual interpretation of the unstructured body of the electronic communication.

In method 300, the manifest record generating program first receives information for a new electronic communication to be sent out (step 310). This information may include recipient name and/or address, carbon copy (CC) or blind carbon copy (BCC) recipients and/or addresses, and other information, such as a subject, date, or other fields. The electronic communication may include, for example, fields such as a sender field, a recipient field, a subject field, and a body field. The electronic communication may be, for example, an e-mail, an SMS or MMS text message, an app-based messaging service, a voice-to-text communication, or other electronic communication.

Next, the manifest generating program receives unstructured text (step 320). Unstructured text may include, for example, a message from the sender to the recipient in the body of the electronic communication. The unstructured data may include, for example, a greeting, a date reminder, an explanation of the purpose of the electronic communication, one or more questions, or other message items.

Subsequently, the manifest record generating program creates a manifest record based on the received information (step 330). The manifest record is structured data that may be attached to or included in the body of the electronic communication. The manifest record specifies, for example, the type of message in the electronic communication and optionally a type of document attached to the electronic communication in addition to associated due date(s).

The manifest record may specify message type for the electronic communication. The manifest record generating program may assign a message type by receiving a user-selected input from a first menu. The manifest record generating program may display the first menu as a drop-down menu, a drag and drop field, a pop-up menu, or alternative appropriate menu type.

The message type may specify a topic for the electronic communication. For example, the message type may denote the type of task that may be required based on the electronic communication content. In the context of a patent docketing system, the message type may be, for example, reporting an issued search report, reporting a filing activity, requesting instructions from patent counsel, or other types of tasks that may be associated with that particular case.

The message type of the electronic communication, (e.g., the topic or purpose for the message), may, for example, include a title, such as "office action received" or "instructions due."

In addition, the manifest record generating program may assign bibliographic information to the manifest record, such as docket numbers, due dates, and names of parties involved. In a patent law case, the bibliographic information may include, for example, the patent office application number, publication number, inventor(s), assignee(s), priority date, filing date, and/or docket number(s).

The manifest record generating program may receive this type of bibliographic information through an additional menu (or set of menus), such as drop-down menus, or alternative a set of fields for user input in a user interface. The manifest record generating program may input this bibliographic information to the manifest record, when generated, as structured text.

The manifest record may also specify a document type where an attachment is included with the electronic communication. The document type may specify a type of form or written communication for the attachment. In the context of a patent docketing system, the document type may be, for example, a patent office notice, search report, or office action, a set of instructions or draft response, an analysis of the case, a reply brief or other opinion, or other types of documents.

The manifest record generating program may assign a document type by receiving input from a second menu. In the second menu, the manifest record generating program may display several choices. The manifest record generating program may display the second menu as a drop-down menu, a drag and drop field, a pop-up menu, or alternative appropriate menu type. The manifest record generating program may change the choices available in the second menu based on the assigned message type received from the first menu.

The manifest record itself may be an electronic document, such as a word document, text file, rich text file, word processor file, excel or other spreadsheet, or comma-separated values (CSV) format file created by the manifest record generating program. The manifest record generating program may include structured text relating to the electronic communication or attachment in the manifest record.

The manifest record generating program may include additional structured text in the manifest record. For example, the manifest record generating program may include structured text in the manifest record related to due date, response date, report information, event information, e-mail purpose, additional attachments, or combinations thereof.

The manifest record generating program may optionally store the manifest record in a local security environment. For example, the manifest record generating program may store the manifest record in a network contained within a firewall, or alternatively on a local drive or computer. The manifest record generating program may, for example, save a copy of the manifest record in a folder on a computer directory.

Optionally, the manifest record generating program may aggregate manifest records for a given file, project, or case. In this case, the manifest record generating program may save copies of manifest records related to that specific file, project, or case, in a centralized location, such that the manifest record generating program may be able to review the aggregated manifest records at a later time. The aggregated manifest records may potentially inform the manifest record generating program in the creation of new manifest records. This feature is discussed in more detail with reference to FIG. 5 below.

After the manifest record generating program creates the manifest record, the manifest record generating program attaches the manifest record to the electronic communication (step 340). In some cases, the program may attach the manifest record as comma separated values, text, or a spreadsheet file to the electronic communication (see, e.g., FIGS. 2A-2B). Alternatively, the program may generate the manifest record for embedding in the electronic communication. For example, the program may generate the manifest record as copy-able structured text that may be copied and pasted into a message body field of an electronic communication. Alternatively, the manifest record generating program may produce an electronic communication with the manifest record already in or attached to the electronic communication.

The manifest record generating program may additionally receive and attach associated document(s) to the electronic communication, in addition to creating and attaching/embedding the manifest record describing the message and document types. In step 350, the manifest record generating program may receive one or more documents for attachment. This may be done by displaying a drag and drop field, or another document receiving field. Optionally, an additional field for the document name(s) may be displayed on a user interface so that the manifest record generating program may associate a name with each document. The program may attach document(s) to the electronic communication before or after creating the manifest record, and before or after attaching/embedding the manifest record to the electronic communication. The attached document(s) may be associated with the document type(s) described in the structured text of the produced manifest record.

Subsequently, the manifest record generating program sends the electronic communication (step 360) to the recipient. In some cases, the program may prepare the electronic communication and allow for review of the electronic communication with manifest record by a user. After confirmation from a user, the manifest record generation program may send the electronic communication with manifest record. Alternatively, the program may generate the electronic communication with manifest record, which may be sent manually. In still another example, the program may generate just the manifest record, which may be manually incorporated into an electronic communication. The receipt of the electronic communication with attached manifest record is discussed with reference to FIG. 4 below.

Figure 4:
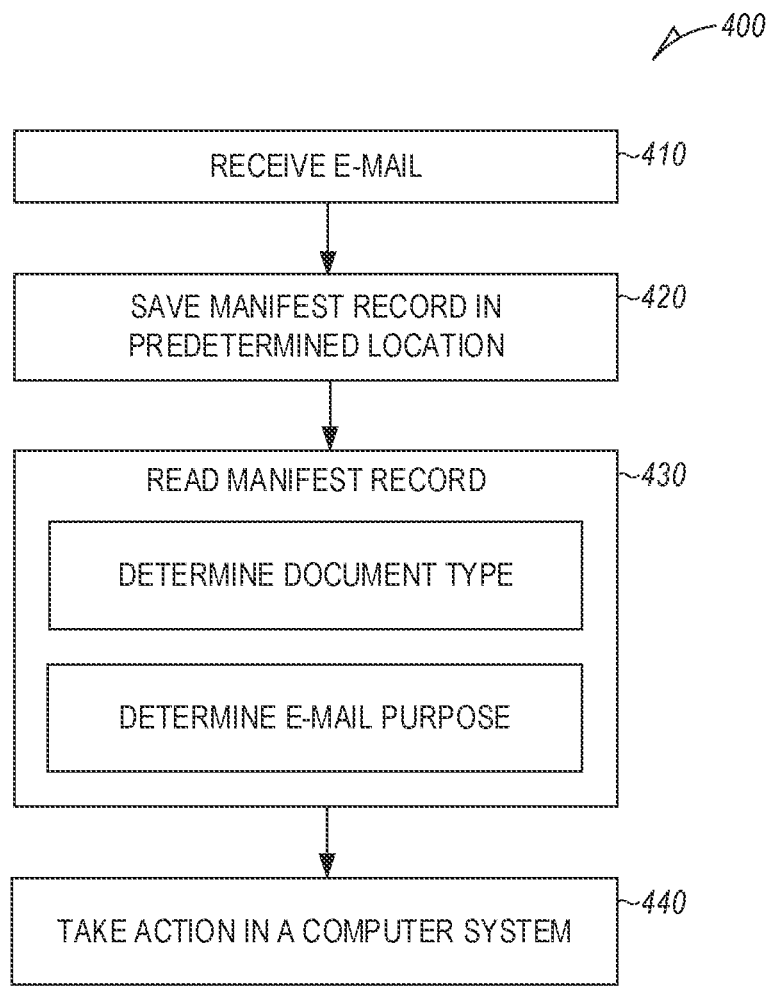
FIG. 4 is a flow chart of the manifest record from FIG. 3 being received and an action being executed based on the manifest record in various embodiments.

FIG. 4 is a method 400 of receiving and interpreting a manifest record made by the manifest record generating program described with reference to FIG. 3 above. In method 400, a computing system, such as, for example, a patent docketing system, receives the manifest record and executes one or more actions based on that manifest record. In method 400, a computing system (e.g., automated or semi-automated docketing system 270 discussed with reference to FIG. 2C) may receive a manifest record 200 from an electronic communication 250. The computing system may then update a project file (e.g., file database 280 discussed with reference to FIG. 2C) according to the structured text in the manifest record 200.

First, in step 410, the computing system receives the electronic communication. In some cases, the computing system may be monitoring incoming electronic communications, such as e-mail, in a particular electronic environment. The computing system may detect which incoming e-mails contain structured data, such as a manifest record, that may be automatically read and executed in the computing system without need to interpret unstructured text.

For example, in the case of a patent docketing system, a docketing system may monitor incoming e-mail and flag those with embedded manifest records received from a foreign agent.

Next, in step 420, the computing system saves a copy of the manifest record in a predetermined location. The computing system may optionally store the manifest record in a local security environment. For example, the computing system may store the manifest record in a network contained within a firewall, or alternatively on a local drive or computer. The computing system may, for example, save a copy of the manifest record in a folder of a computer directory.

In some embodiments, the computing system may aggregate manifest records pertaining to a single case, project, or file, in a single location for reference or to be read and analyzed in the production of future manifest records with a manifest record generating program.

In step 430, the computing system reads the manifest record to determine the message type, the document type (if the electronic communication contains an applicable attachment), and associated deadlines. The message type may be, for example, an electronic communication conveying a response from a patent office, a new action required by an applicant, a docketing task, a new deadline that must be met for a case, or a reminder electronic communication. The document type may be, for example, an office action, a filing receipt, or a communication from a foreign agent. The document type may be associated with the message type.

The computing system may additionally read structured text directed to other information in the manifest record, such as, for example, due dates, reminder dates, parties involved, actions required, report information, event information, other attachments, associated actions or follow-ups, or more.

Based on the deduced message and document types, the computing system may institute or execute an action by a computing program within a computing or network system (step 440).

The action may be automated based on the information received from the manifest record. In some instances, the computing program may additionally extract unstructured text from the electronic communication for storage, analysis, or review.

For example, where an electronic communication from a foreign patent agent is received with an attached manifest record, the computing system (a docketing system here) would analyze the structured text of the manifest record. The structured text could indicate that the message is relaying a recent search report issued by the foreign patent office. The structured text could additionally indicate that a response is due within six months of receipt of the search report. In this case, the computing system could record the deadline and schedule reminders for the parties working on that case, in addition to notifying the interested parties that a search report was received.

Figure 5:
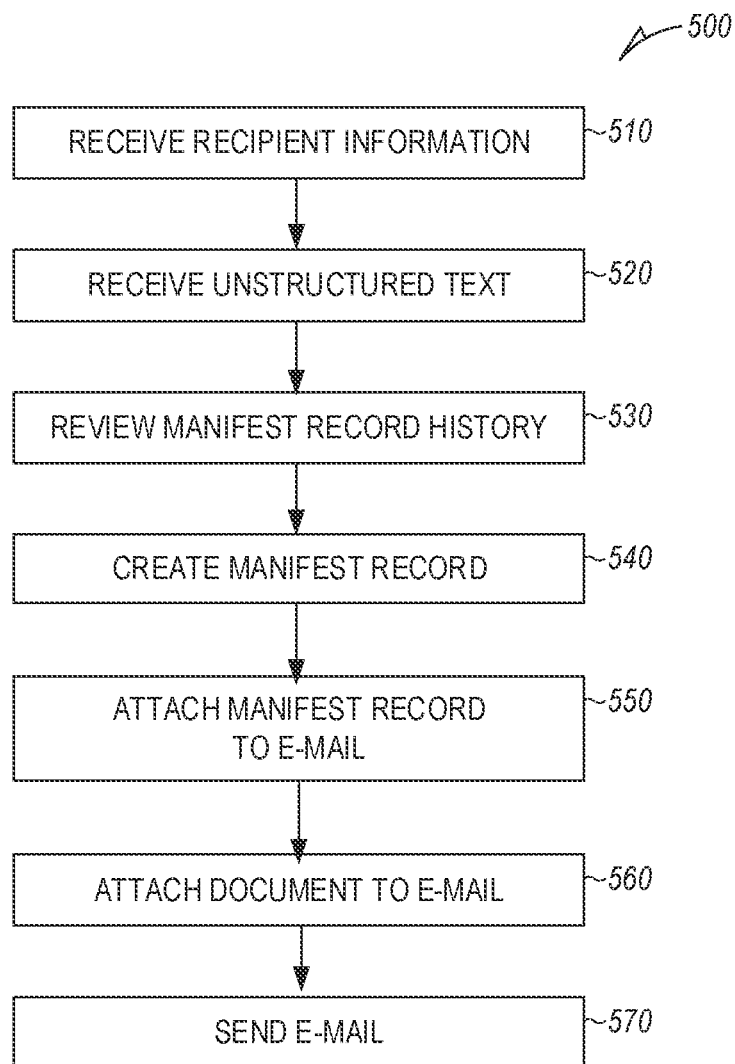
FIG. 5 is a flow chart depicting the use of a manifest record generating program in a predictive manner in various embodiments.

FIG. 5 is a flow chart depicting the use of the manifest record generating program in a predictive manner in method 500. In some embodiments, the manifest record generating program may fetch prior created and saved manifest records to inform the creation of new manifest records. In method 500, a manifest record generating program (e.g. manifest record creation system 100 discussed with reference to FIGS. 1 and 2A-2C) may create a manifest record 200 for sending with an electronic communication 250 through an electronic communication system 260. In method 500, the manifest record generating program functions in a predictive manner to allow easier updates to project files.

In this case, the manifest record generating program may read or detect manifest records relevant to a specific case or file in a given directory. As shown in FIG. 5, the manifest record generating program first receives electronic communication information (step 510) and unstructured text (step 520), similar to the corresponding steps discussed with reference to FIG. 3.

However, when the manifest record generating program is working based off aggregated manifest record(s), the manifest record generating program then reviews the relevant historical manifest records (step 530).

In some cases, the manifest record generating program may determine, based on the content of the aggregated manifest record(s), what the most likely next message type and document type should be. For example, in a patent docketing system, the manifest record generating program may determine, based on the aggregated manifest record(s), qualities such as upcoming due dates, typical response types and timelines that are upcoming, or which document(s) will be sent or received next. The potential message type and document type may be deduced from this information.

The manifest record generating program may, based on the aggregated manifest record(s), produce a selection of options for the message type and the document type based on the history of the case. For example, where a U.S. patent case has previously received a non-final office action and subsequent response, the manifest record generating program may deduce that the next communication received from the patent office could potentially be a final office action. Thus, the manifest record generating program may display "final office action" for document type as an option in a menu.

The manifest record generating program may then create the manifest record (step 540) once it has confirmed the document type and message type. Similar to the method described with reference to FIG. 3, the manifest record generating program would then attach the manifest record and document to the electronic communication (steps 550, 560) and send the electronic communication (step 570).

Sample Embodiments

Figure 6:
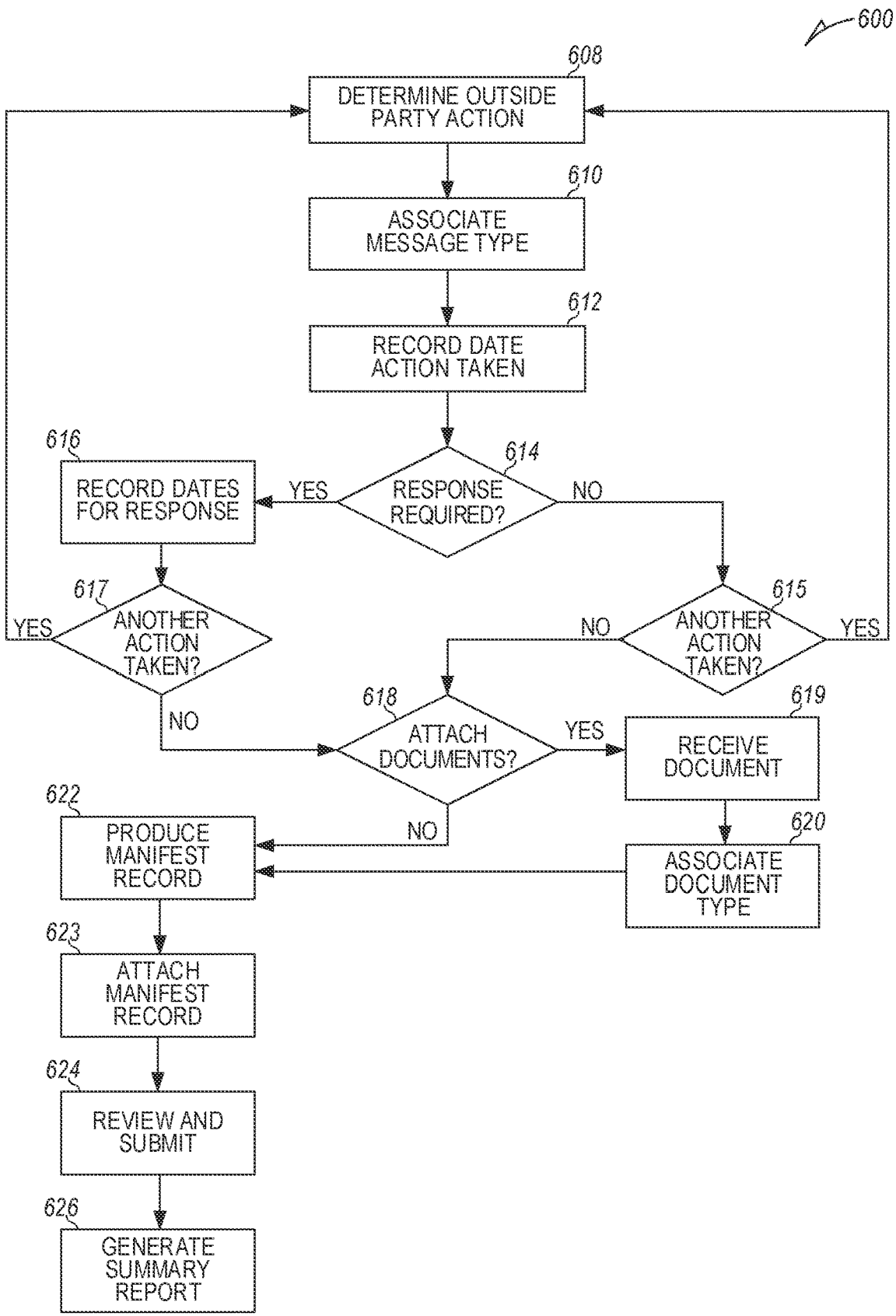
FIG. 6 is a flow chart of a manifest record generating program creating a manifest record for an outside organization action in various embodiments.

FIG. 6 is a flow chart showing a method 600 of the manifest record generating program creating a manifest record for an outside organization action, for example, for reporting actions taken by a patent office, government organization, or other entity outside the business. For example, where an action by a patent office is received by an attorney's office, the attorney's team may use the manifest record generating program to create a manifest record depicting the action type, required response, and due date of that response, to send out with an electronic communication to a client or to a corresponding foreign agent, or internally within the attorney's office.

In method 600, the manifest record generating program determines the action taken by the patent office (or other outside organization) (608). The manifest record generating program may determine the action by showing a display and receiving a selection from pre-determined list of actions. In some examples, the pre-determined list of actions may be a drop-down menu or other user interface. For example, in a patent office, the action may be the issuance of an office action or search report, a filing receipt, a notice of abandonment, a notice of allowance, or other items.

The manifest record generating program may determine the message type based on the action taken by the outside party (e.g., based on an action taken by the relevant patent office) (610). The manifest record generating program may deduce, based on the type of action taken, what message type to associate with the electronic communication for the manifest record. For example, the message type may be a report out of a received office action.

Once the manifest record generating program determines the action taken by the patent office and the message type, the manifest record generating program may record the date the action was taken, if applicable (612). In this case, the manifest record generating program may receive and record date information from a field in the user interface. The date may be, for example, the date the patent office acted, the date the patent office mailed a notice, or the date the notice was received.

Subsequently, the manifest record generating program may record whether a response is required to the action of the patent office (614). The manifest record generating program may receive information on date and whether a response is required through the user interface display. For example, if an office action is received from a patent office, the manifest record generating program may record that an amendment or other response may be required. This may be done, for example, by the manifest record generating program showing a display requesting whether a response is required and receiving input.

If a response is required, the manifest record generating program may prompt the user to insert a due date for the response by showing a display (616). After receiving the due date, the manifest record generating program may determine whether another action has been received or is required (617). If another action is required, the manifest record generating program will cycle back to the beginning and determine the corresponding patent office action.

If a response is not required to the original action, the manifest record generating program may skip recording a due date, and instead determine whether another action is has been received or is required by producing a display asking whether another action is required. If another action is required (615), the manifest record generating program will cycle back to the beginning and determine the corresponding patent office action.

Once all related actions by the patent office and required response and due dates have been determined and cataloged by the manifest record generating program to ensure association of the correct message type, the manifest record generating program may receive and attach documents (618, 619). The manifest record generating program may, for example, produce a document retrieval display and receive the document through a menu such as a drag and drop menu.

The manifest record generating program may then associate a document type based on the attached document(s) (620). The manifest record generating program may take the message type, document type, and other due date information, and create the manifest record. The manifest record may then be attached to the electronic communication by the manifest record generating program (622). If there are no documents to attach, the manifest record generating program may skip the association of document type and simply create a manifest record based on the message type.

Once the manifest record is attached to the electronic communication, the manifest record generating program may produce a review screen display (623, 624). When the manifest record generating program receives confirmation and submission of the electronic communication with attached manifest record and documents, the manifest record generating program may provide a summary report (626).

For example, if the manifest record generating program is reporting a search report received from a patent office, the manifest record generating program may categorize the patent office action as a search report, record the appropriate response date, and produce associated message type in the structured text based on the received search report. The manifest record generating program may then receive and attach the search report document to the electronic communication and associate the appropriate document type in the structured text.

The manifest record generating program may take the associated structured text, including the message type and document type, to create a manifest record containing structured data encoding the message type, document type, and potentially other structured text, such as due dates or associated parties. The manifest record generating program may attach the manifest record to the electronic communication, along with the document search report, and subsequently allow for review and sending of the electronic communication with the manifest record.

Figure 7:
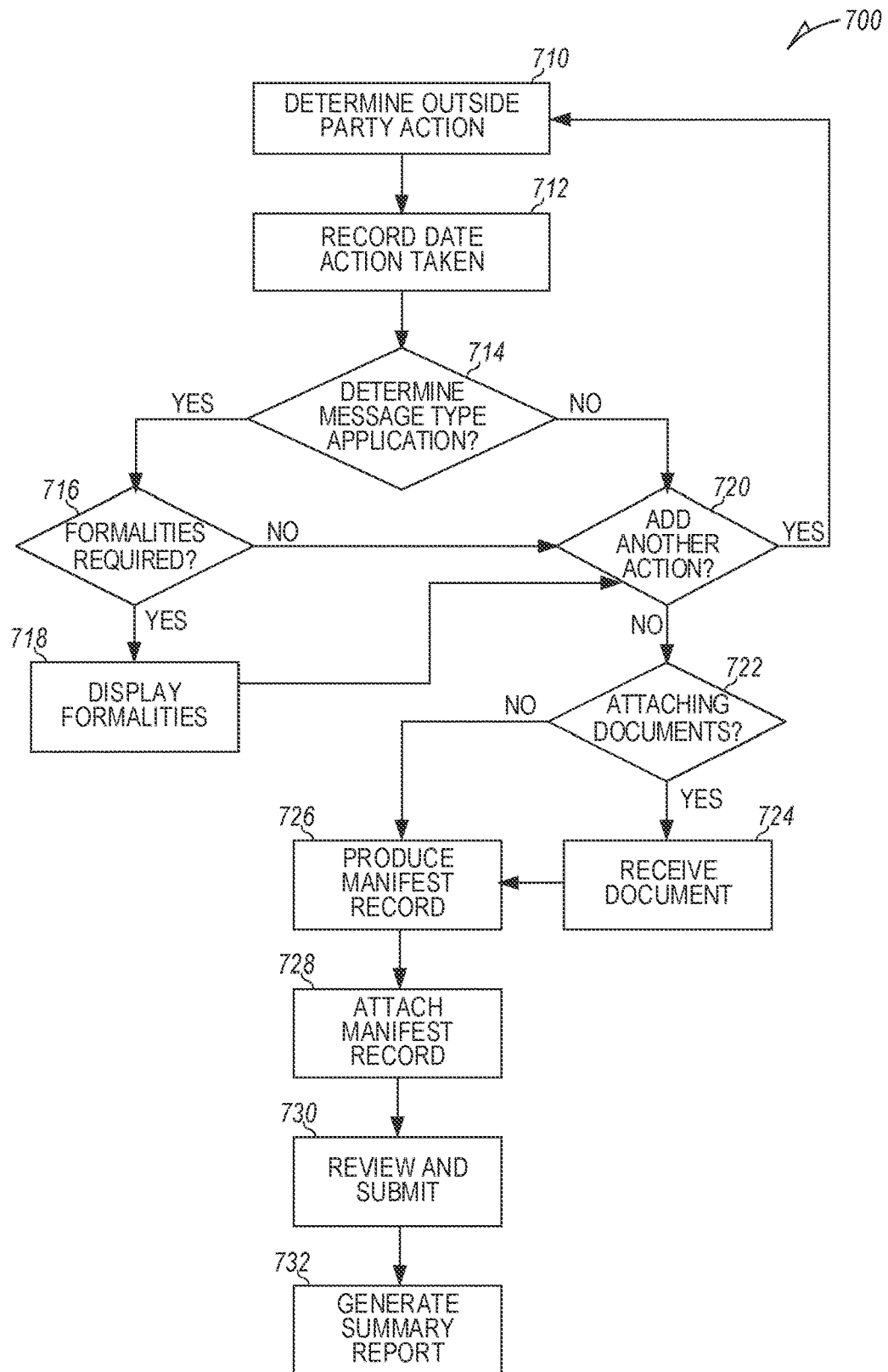
FIG. 7 is a flow chart of a manifest record generating program creating a manifest record for an internal action reporting to the outside organization in various embodiments.

FIG. 7 is a flow chart of the manifest record generating program creating a manifest record for an internal action reporting to the outside organization. For example, method 700 could include, but is not limited to, reporting of filing an amendment or response in a patent office, reporting of filing a motion or brief in court, or reporting of sending instructions to other counsel. Specifically, a law office could use the manifest record generating program to create a manifest record depicting the type of action taken by the law office and any corresponding date and include that manifest record with an electronic communication to the client.

First, the manifest record generating program determines what action was taken by the internal organization (710). The manifest record generating program may display, for example, a drop-down list of actions that the internal organization could take or has taken.

Next, the manifest record generating program may record the date action was taken (712). The manifest record generating program may display a text field or a calendar field to receive the date action was taken.

Based on the action that was taken, the manifest record generating program may associate a message type with the action and electronic communication (714). If the action is, for example, filing of a patent application in a patent office, either in the U.S. or internationally, the manifest record generating program may show a display specific to the action of filing a patent application.

For example, if the message type is reporting of filing of a patent application, the manifest record generating program may then show a display confirming whether formalities are required for that patent application (716). If the manifest record generating program receives a "yes" answer to this display, the manifest record generating program may then display the appropriate formality fields to be filled (718).

Subsequently, the manifest record generating program may show a display requesting whether there is another action that was taken and should be included with this particular electronic communication (720). If the answer received is "yes," the manifest record generating program may display the first field (710) again, to determine the action type and message type.

Once the manifest record generating program has gathered sufficient information on the actions taken by the internal organization, such as whether the action was filing of a patent application and the associated formalities, and associated a message type with the particular electronic communication, the manifest record generating program may determine whether documents will be attached to the electronic communication.

The manifest record generating program may display a field requesting whether documents will be attached (722). If documents will be attached, the manifest record generating program may display a field for receiving documents, such as a drag-and-drop field. Based on the documents received, the manifest record generating program may associate a document type (724).

Using the associated message type and document type, the manifest record generating program may build a manifest record (726, see also FIGS. 2A-2B). The manifest record may be, for example, structured text (e.g., .CSV or excel file) containing information regarding the message type, document type, and other associated structured text such as due dates. The manifest record generating program may then attach the manifest record to the electronic communication (728).

After attachment of the manifest record, the manifest record generating program may show a review display, with an option (e.g., a button) to submit the electronic communication with attached manifest record (730). The manifest record generating program may then send the electronic communication.

After submission, the manifest record generating program may then create a summary report for review by a user (732). This summary may be presented on a display by the manifest record generating program, sent to the user by the manifest record via electronic communication, or saved as a file in the local computer environment.

Figure 8:
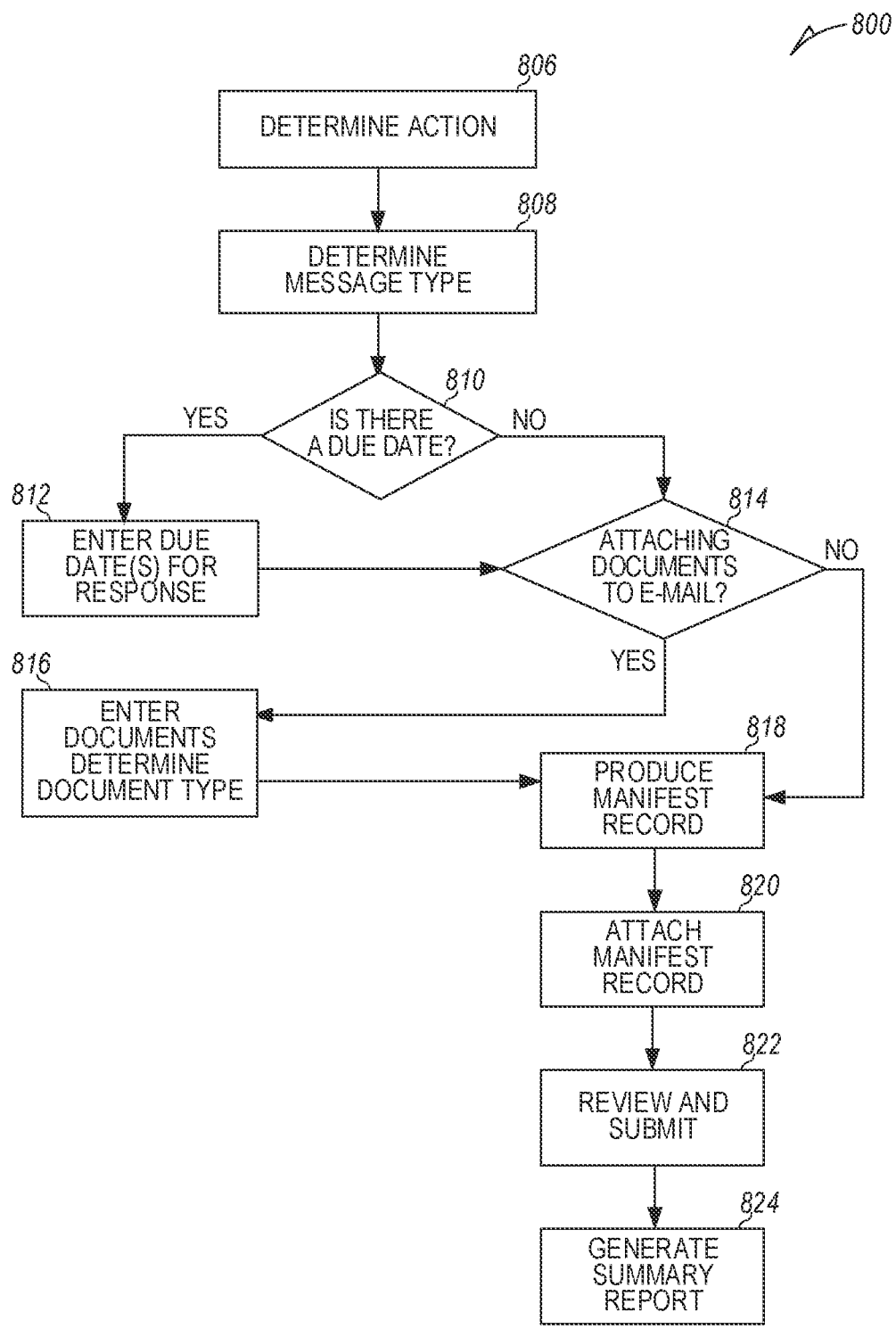
FIG. 8 is a flow chart of a manifest record generating program creating a manifest record for an action by a third party in various embodiments.

FIG. 8 is a flow chart of the manifest record generating program creating a manifest record for an action by a third party, such as, for example, a foreign agent. For example, the foreign agent may use the manifest record generating program to create a manifest record that specifies the most recent action by a foreign patent office, including the due date, to include with an electronic communication to a U.S. attorney working on the corresponding case.

The manifest record generating program may first determine the action being taken (806) and the associated message type (808). In this case, an electronic communication may be sent to or received from the foreign agent that includes an attached or imbedded manifest record. The message type may be, for example, reporting filing or publication of a foreign patent application, reporting of a search report received, an opposition or reexam, or reporting of abandonment or issuance.

Then, the manifest record generating program may determine whether there is an upcoming due date by displaying the question for a user and receiving a yes or no response (810). If the manifest record receives a "yes" response and there is a due date associated with the electronic communication, the manifest record generating program may display a text field or calendar field to receive the due date (812). For example, if the foreign agent is sending along a search report, a due date for response to that search report may be entered in step 812.

The manifest record generating program may subsequently show a display asking whether document(s) will be attached to the electronic communication (814). (If there is no associated due date, the manifest record generating program may skip to this step 814). If the manifest record generating program receives a positive response ("yes"), the manifest record generating program may show a display for receiving the document(s) and any accompanying reminders (816). For example, a foreign search report, or a response/amendment written by the foreign agent may be attached to the electronic communication at this stage.

At step 816, the manifest record generating program may record the document type associated with the attached document(s). After the manifest record generating program has determined and recorded all due dates and document types, the manifest record generating program may create the manifest record.

The manifest record generating program may take the determined message type (from step 808) and determined document type (from step 816) and create the manifest record to be included with the electronic communication (818) and attach it to or embed it in the electronic communication (820).

After attachment of the manifest record, the manifest record generating program may show a review display, with an option (e.g., a button) to submit the electronic communication with attached manifest record (822). The manifest record generating program may then send the electronic communication.

After submission, the manifest record generating program may then create a summary report for review by a user (824). This summary may be presented on a display by the manifest record generating program, sent to the user by the manifest record via electronic communication, or saved as a file in the local computer environment.

Figure 9:
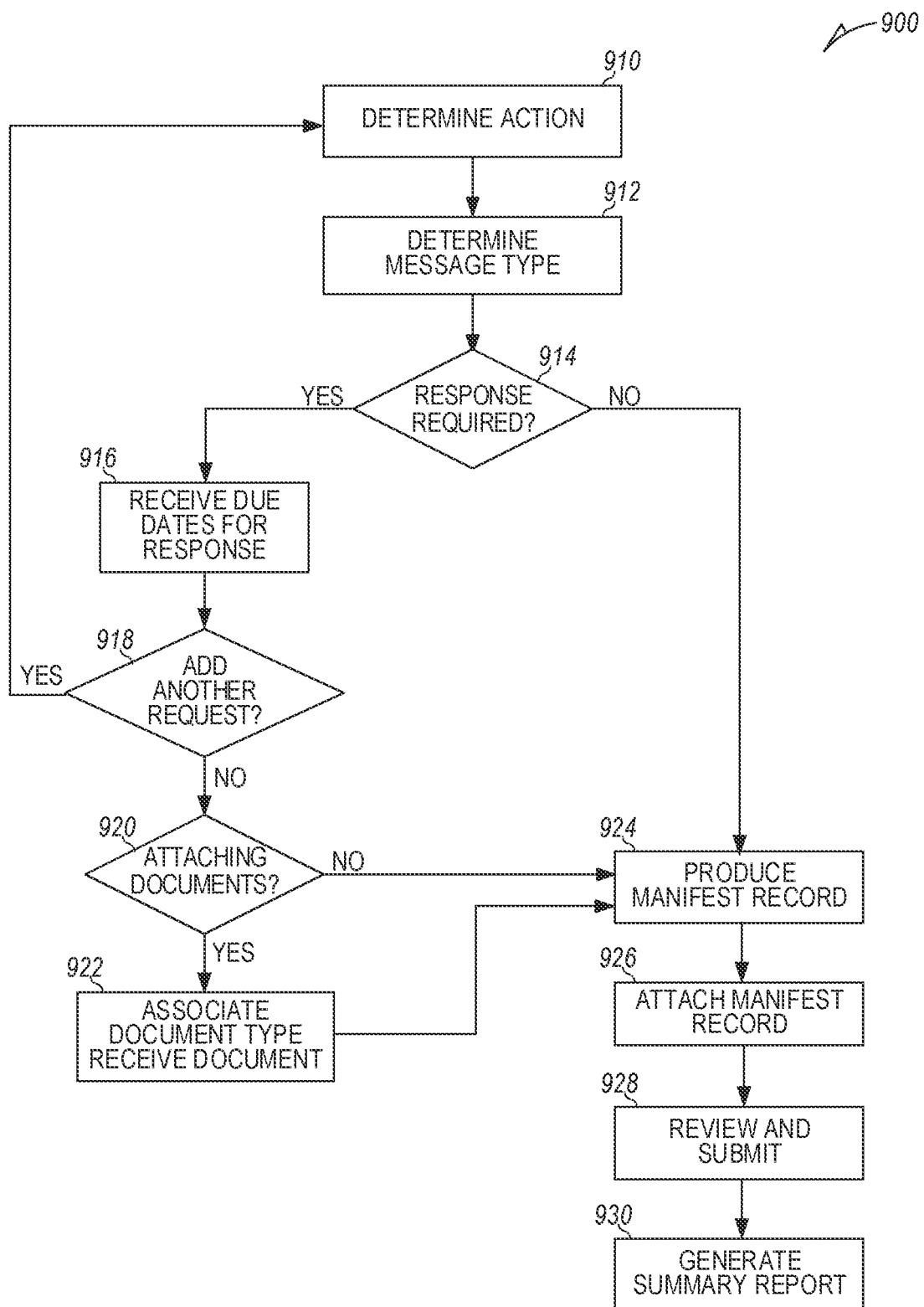
FIG. 9 is a flow chart of a manifest record generating program creating a manifest record for an internal action reporting to a third party in various embodiments.

FIG. 9 is a flow chart of the manifest record generating program creating a manifest record for an internal action reporting to a third party, such as an internal person reporting to a foreign agent. For example, where a U.S. attorney writes instructions for a foreign agent in the corresponding case, the manifest record generating program may create a manifest record specifying the action taken by the U.S. attorney and the appropriate due dates.

In method 900, the manifest record generating program first determines the action being taken and the associated message type (910, 912). In this case, that could include, for example, instructions written by the U.S. attorney.

Subsequently, the manifest record generating program may show a display inquiring whether a response is required to the action and electronic communication. (914) If the manifest record generating program receives an affirmative response ("yes"), the manifest record generating program may display a text or calendar field for the appropriate due date and record that due date (916).

After receiving the due date, the manifest record generating program may show a display asking if there is another request to be added (918). If the manifest record generating program receives an affirmative response ("yes"), the manifest record generating program may cycle back to the first display to determine the action being taken and the message type associated with the second request (910, 912).

If there is not a second request, the manifest record generating program may show a display asking whether document(s) will be attached (920). If "yes," the manifest record generating program may then display a document receiving field (e.g., a drag and drop field), and receive the documents (922). The manifest record generating program may then associate a document type with those document(s).

Once all the appropriate requests have been recorded, along with the corresponding due dates (or in the instance where a response is not required an there is no associated due date) and documents, the manifest record generating program may produce the manifest record based on the associated message type and document type (924) and attach the manifest record (926).

After attachment of the manifest record, the manifest record generating program may show a review display, with an option (e.g., a button) to submit the electronic communication with attached manifest record (928). The manifest record generating program may then send the electronic communication.

After submission, the manifest record generating program may then create a summary report for review by a user (930). This summary may be presented on a display by the manifest record generating program, sent to the user by the manifest record via electronic communication, or saved as a file in the local computer environment.

FIG. 10 is a schematic of the user interface 1000 of the manifest record generating program. The user interface 1000 may include, for example, a field for the type of action (1010), a field for due date (1012), and a field for document reception (1014), among other fields for bibliographic data. User interface 1000 may be the user interface for a manifest record creation system such as system 100 discussed with reference to FIGS. 1, 2A-2C above. Interaction with user interface 1000 may allow for the manifest record generating program to create a manifest record 200 according to user inputs.

The type of action field 1010 may be, for example, a drop-down menu with a pre-selected list of potential actions. These may include, for example, report outs of outside organization (e.g., patent office actions) such as filing receipts, search reports, office actions, advisory actions, notices of allowance, notices of abandonment, or other actions. The list may alternatively or additionally include actions related to foreign agents, such as reports of actions done by foreign offices, reports of filing application or amendments, or other reminders.

The manifest record generating program may let the due date field 1012 appear or disappear depending on the action selected in the initial field 1010. If the action has an associated due date, the manifest record generating program may present the due date field as an open text field or as a calendar field.

The document reception field 1014 may be, for example, a drag-and-drop field where a user may insert various documents. The document reception field 1014 may have a variable number of slots depending on the action chosen in the initial field 1010. For example, if a report out of an issued office action is selected in field 1010, then field 1014 may change to allow for attachment of one document titled "office action."

Computer Embodiment

Figure 11:
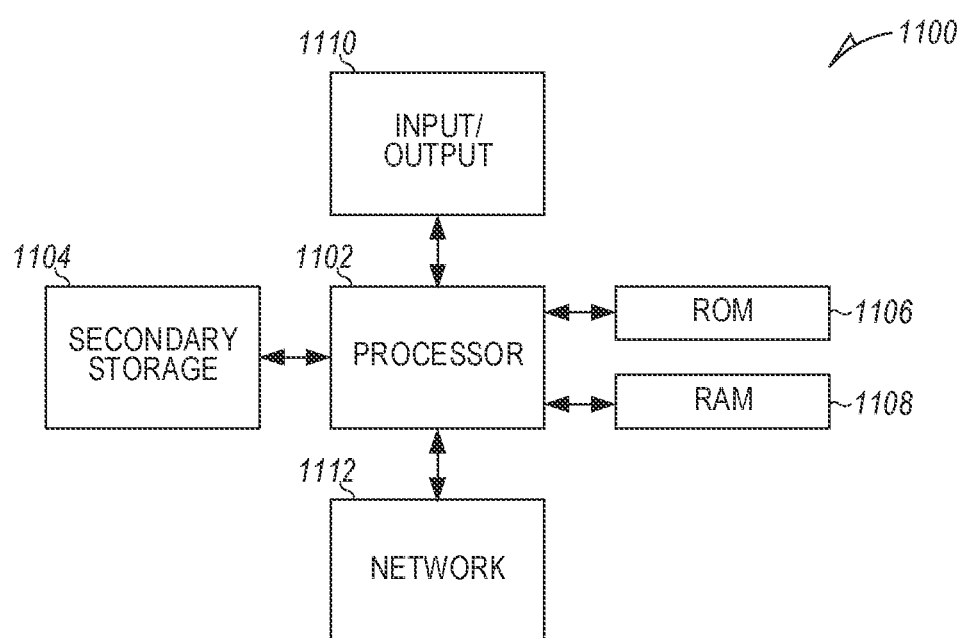
FIG. 11 is a block diagram of a typical, general-purpose computer that may be programmed into a special purpose computer suitable for implementing one or more embodiments of the manifest record generating program disclosed herein.

FIG. 11 is a block diagram of a typical, general-purpose computer 1100 that may be programmed into a special purpose computer suitable for implementing one or more embodiments of the manifest record generating program disclosed herein. The manifest record generating program described above may be implemented on any general-purpose processing component, such as a computer with sufficient processing power, memory resources, and communications throughput capability to handle the necessary workload placed upon it. The computer 1100 includes a processor 1102 (which may be referred to as a central processor unit or CPU) that is in communication with memory devices including secondary storage 1104, read only memory (ROM) 1106, random access memory (RAM) 1108, input/output (I/O) devices 1110, and network connectivity devices 1112. The processor 1102 may be implemented as one or more CPU chips or may be part of one or more application specific integrated circuits (ASICs).

The secondary storage 1104 is typically comprised of one or more disk drives or tape drives and is used for non-volatile storage of data and as an over-flow data storage device if RAM 1108 is not large enough to hold all working data. Secondary storage 1104 may be used to store programs that are loaded into RAM 1108 when such programs are selected for execution. The ROM 1106 is used to store instructions and perhaps data that are read during program execution. ROM 1106 is a non-volatile memory device that typically has a small memory capacity relative to the larger memory capacity of secondary storage 1104. The RAM 1108 is used to store volatile data and perhaps to store instructions. Access to both ROM 1106 and RAM 1108 is typically faster than to secondary storage 1104.

The devices described herein may be configured to include computer-readable non-transitory media storing computer readable instructions and one or more processors coupled to the memory, and when executing the computer readable instructions configure the computer 1100 to perform method steps and operations described above with reference to FIG. 3 to FIG. 9. The computer-readable non-transitory media includes all types of computer readable media, including magnetic storage media, optical storage media, flash media and solid-state storage media.

It should be further understood that software including one or more computer-executable instructions that facilitate processing and operations as described above with reference to any one or all of steps of the disclosure may be installed in and sold with one or more servers and/or one or more routers and/or one or more devices within consumer and/or producer domains consistent with the disclosure. Alternatively, the software may be obtained and loaded into one or more servers and/or one or more routers and/or one or more devices within consumer and/or producer domains consistent with the disclosure, including obtaining the software through physical medium or distribution system, including, for example, from a server owned by the software creator or from a server not owned but used by the software creator. The software may be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments may be implemented, at least in part, in digital electronic circuitry, analog electronic circuitry, or in computer hardware, firmware, software, or in combinations of them. These components may be implemented, for example, as a computing program product such as a computing program, program code or computer instructions tangibly embodied in an information carrier, or in a machine-readable storage device, for execution by, or to control the operation of, data processing apparatus such as a programmable processor, a computer, or multiple computers.

A computing program may be written in any form of programming language, including compiled or interpreted languages, and it may be deployed in any form, including as a stand-alone program or as a module, component, subroutine, or other unit suitable for use in a computing environment. A computing program may be deployed to be executed on one computer or on multiple computers at one site or distributed across multiple sites and interconnected by a communication network. Also, functional programs, codes, and code segments for accomplishing the techniques described herein may be easily construed as within the scope of the present disclosure by programmers skilled in the art. Method steps associated with the illustrative embodiments may be performed by one or more programmable processors executing a computing program, code or instructions to perform functions (e.g., by operating on input data and/or generating an output). Method steps may also be performed by, and apparatus may be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general-purpose processor, a digital signal processor (DSP), an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computing program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computing program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory may be supplemented by or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure. A software module may reside in random access memory (RAM), flash memory, ROM, EPROM, EEPROM, registers, hard disk, a removable disk, a CD-ROM, or any other form of storage medium known in the art. An exemplary storage medium is coupled to the processor such the processor may read information from, and write information to, the storage medium. In the alternative, the storage medium may be integral to the processor. In other words, the processor and the storage medium may reside in an integrated circuit or be implemented as discrete components.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors, such that the instructions, when executed by one or more processors cause the one or more processors to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Notes and Examples

The following, non-limiting examples, detail certain aspects of the present subject matter to solve the challenges and provide the benefits discussed herein, among others.

Example 1 includes a method of creating a manifest record for an outgoing electronic communication including receiving a message comprising unstructured text to be inserted into the outgoing electronic communication, generating a manifest record for attachment to the outgoing electronic communication using a web browser executing an application downloaded from a server remote from the client computer, the manifest record comprising structured data specifying a message type, wherein generating the manifest record comprises the application receiving a selection of a message type from a first menu comprising a plurality of choices for the message type and producing structured data based on the selection, outputting the manifest record and saving the manifest record to the client computer, attaching the manifest record to the outgoing electronic communication, and sending the outgoing electronic communication with the manifest record.

Example 2 includes Example 1, wherein the manifest record indicates an action to be executed by an automated electronic system upon receipt of the electronic communication.

Example 3 includes any of Examples 1-2, wherein displaying the first menu comprises displaying a drop-down menu, drag and drop fields, or pop-up menu.

Example 4 includes any of Examples 1-3, wherein the structured data specifies the message type.

Example 5 includes any of Examples 1-4, further including identifying at least one document to be sent with the outgoing electronic communication.

Example 6 includes any of Examples 1-5, wherein the manifest record further comprises structured data specifying a document type associated with the at least one document.

Example 7 includes any of Examples 1-6, wherein generating the manifest record further comprises assigning the document type associated with the at least one document.

Example 8 includes any of Examples 1-7, wherein assigning the document type associated with the at least one document comprises displaying a second menu including a plurality of choices for the document type, receiving a selection from the second menu, and producing structured data based on the selection.

Example 9 includes any of Examples 1-8, further including changing the plurality of choices for the document type in the second menu depending on the message type.

Example 10 includes any of Examples 1-9, wherein displaying the second menu comprises displaying a choice of document type including one of a plurality of forms or one of a plurality of written communication types.

Example 11 includes any of Examples 1-10, further including storing the manifest record in a local security environment.

Example 12 includes any of Examples 1-11, wherein storing the manifest record in a local security environment including storing the manifest record in a network having a firewall.

Example 13 includes any of Examples 1-12, wherein storing the manifest record comprises placing the manifest record in a folder in a computer directory.

Example 14 includes any of Examples 1-13, wherein generating the manifest record comprises generating a word processing document, a text file, a comma separated values file, or a rich text file.

Example 15 includes any of Examples 1-14, wherein generating the manifest record further comprises generating structured text describing document type, due date, report information, event information, electronic communication purpose, attachments, or combinations thereof.

Example 16 includes any of Examples 1-15, further including fetching prior manifest records to inform the creation of new manifest records.

Example 17 includes any of Examples 1-16, further including: aggregating manifest records to produce aggregated manifest records, analyzing the aggregated manifest records, and executing an action in a computing system based on the analyzing the aggregated manifest records.

Example 18 includes any of Examples 1-17, further including: reading one or more manifest records, analyzing the one or more manifest records to determine document types and/or message types specified in the manifest records, and dynamically determining one or more menu selections to display based on the one or more manifest records.

Example 19 includes a method comprising receiving an electronic communication having unstructured text in a body of the electronic communication and a manifest record that specifies a message type associated with the electronic communication, saving a copy of the manifest record, reading the manifest record to determine the message type, and executing an action in an electronic system automatically based on the manifest record.

Example 20 includes Example 19, wherein the electronic communication further comprises a document attached to the electronic communication.

Example 21 includes any of Examples 19-20, further including saving a copy of the document, and reading the manifest record to determine the document type.

Example 22 includes any of Examples 19-21, wherein saving the copy of the manifest record comprises saving the manifest record in a local security environment including a network with a firewall.

Example 23 includes any of Examples 19-22, wherein reading the manifest record comprises automated interpretation of the structured text in the manifest record.

Example 24 includes any of Examples 19-23, wherein executing an action in an electronic system automatically based on the manifest record comprises matching the manifest record to one or more stored templates and executing one or more actions based on those templates.

Example 25 includes any of Examples 19-24, wherein executing an action in an electronic system automatically based on the manifest record comprises moving one or more files within a database to one or more specified locations.

Example 26 includes any of Examples 19-25, wherein executing an action in an electronic system automatically based on the manifest record comprises adding the message to a database.

Example 27 includes any of Examples 19-26, wherein executing an action in an electronic system automatically based on the manifest record comprises updating a database.

Example 28 includes any of Examples 19-27, wherein executing an action in an electronic system automatically based on the manifest record comprises sending a new electronic communication.

Example 29 includes any of Examples 19-28, wherein executing an action in an electronic system automatically based on the manifest record comprises launching a computer program or application.

Example 30 includes any of Examples 19-29, wherein executing an action in an electronic system automatically based on the manifest record comprises scheduling a deadline for a one or more projects.

Example 31 includes a non-transitory computer-readable medium that stores instructions that when executed by one or more processors cause the one or more processors to perform operations including receiving a message including unstructured text to be inserted into an outgoing electronic communication, generating a manifest record for attachment to the outgoing electronic communication, the manifest record including structured data specifying a message type, wherein generating the manifest record comprises assigning the message type associated with the message to the manifest record, attaching the manifest record to the outgoing electronic communication, and sending the outgoing electronic communication with the manifest record attached.

Example 32 includes Example 31 wherein manifest record indicates a responsive action to be taken by a file management system upon receipt of the electronic communication.

Example 33 includes any of Examples 31-32, further including instructions that when executed by the one or more processors cause the one or more processors to attach a document to the electronic communication.

Example 34 includes any of Examples 31-33, wherein the structured data further comprises one or more deadlines.

Example 35 includes any of Examples 31-34, wherein the structured data further comprises report information, event information, electronic communication purpose, attachments, or combinations thereof.

Example 36 includes any of Examples 31-35, further including instructions that when executed by the one or more processors cause the one or more processors to store the manifest record in a local security environment.

Example 37 includes a non-transitory computer-readable medium that stores instructions that when executed by one or more processors cause the one or more processors to perform operations including receiving an electronic communication having unstructured text in a body of the electronic communication and a manifest record specifying a message type associated with the electronic communication, saving a copy of the manifest record, reading the manifest record to determine the message type, and executing an action in an electronic system automatically based on the manifest record.

Example 38 includes Example 37, wherein the manifest record comprises structured data.

Example 39 includes any of Examples 37-38, wherein the electronic communication further comprises a document attached to the electronic communication.

Example 40 includes any of Examples 37-39, wherein the manifest record further specifies a document type associated with the document.

Example 41 includes any of Examples 37-40, further including instructions that when executed by the one or more processors cause the one or more processors to read the manifest record to determine the document type.

Example 42 includes any of Examples 37-41, further including instructions that when executed by the one or more processors cause the one or more processors to execute an action in an electronic system automatically based on the document type.

Example 43 includes any of Examples 37-42, further including instructions that when executed by the one or more processors cause the one or more processors to save a copy of the document.

Example 44 includes a system having a manifest record creation system that creates a manifest record including structured text describing an action to be executed by a computing machine upon receipt of an associated electronic communication, and an electronic communication system that produces an electronic communication, attaches the manifest record to the electronic communication, and sends the electronic communication to a recipient.

Example 45 includes Example 44, further including one or more sources of data configured to input data or documents into the manifest record creation system.

Example 46 includes any of Examples 44-45, wherein the manifest record creation system comprises a computer program with a user interface for input of data and documents.

Example 47 includes a system having an electronic communication system that receives an electronic communication with manifest record attached, the manifest record including structured test describing an action to be taken upon receipt of the electronic communication, and an automated docketing system that interprets the structured text in the manifest record and executes the action.

Example 48 includes Example 47, wherein the automated docketing system is fully automated.

Example 49 includes any of Examples 47-48, wherein the automated docketing system is partially automated.

Example 50 includes any of Examples 47-49, further including a database configured to receive the action executed by the automated docketing system.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The invention claimed is:

1. A method of creating a manifest record for an outgoing electronic communication on a client computer, comprising:
   receiving a message comprising unstructured text to be inserted into the outgoing electronic communication, the message related to a docketing project;
   analyzing the unstructured text to generate a manifest record for attachment to the outgoing electronic communication using a web browser executing an application downloaded from a server remote from the client computer, the manifest record comprising structured data related to the docketing project;
   wherein the manifest record indicates one or more automated actions to be executed by an automated electronic docketing system upon receipt of the electronic communication, the one or more automated actions related to the docketing project;
   referencing the manifest record to generate a docketing workflow, the docketing workflow related to the docketing project;
   wherein the one or more automated actions to be executed by the automated electronic docketing system indicated by the structured text are encompassed in the docketing workflow, wherein the docketing workflow comprises instructions for identifying the related docketing project, creating a reminder system, and filing one or more documents;
   wherein generating the manifest record comprises the application receiving a selection of a message type from a first menu comprising a plurality of choices for the message type and producing structured data based on the selection, the structured data indicative of the message type and of the docketing workflow to be executed in the automated electronic docketing system;
   the application outputting the manifest record and saving the manifest record to the client computer;
   attaching the manifest record to the outgoing electronic communication, the manifest record containing the structured data configured for automated interpretation by the automated electronic docketing system; and
   sending the outgoing electronic communication with the manifest record containing the structured data indicating the message type and the docketing workflow to be executed in the automated electronic docketing system.

2. The method of claim 1, wherein the structured data specifies a message type.

3. The method of claim 1, further comprising identifying at least one document to be sent with the outgoing electronic communication, and wherein the manifest record further comprises structured data specifying a document type associated with the at least one document.

4. The method of claim 3, wherein generating the manifest record further comprises assigning the document type associated with the at least one document, and wherein assigning the document type associated with the at least one document comprises displaying a second menu comprising a plurality of choices for the document type, receiving a selection from the second menu, and producing structured data based on the selection.

5. The method of claim 1, further comprising storing the manifest record in a local security environment.

6. The method of claim 1, wherein generating the manifest record further comprises generating structured text describing document type, due date, report information, event information, electronic communication purpose, attachments, or combinations thereof.

7. The method of claim 1, further comprising fetching prior manifest records to inform the creation of new manifest records.

8. The method of claim 1, further comprising:
   aggregating manifest records to produce aggregated manifest records;
   analyzing the aggregated manifest records; and
   determining one or more automated actions to be added to the docketing workflow.

9. The method of claim 1, further comprising:
   reading one or more manifest records;
   analyzing the one or more manifest records to determine document types and/or message types specified in the manifest records; and
   dynamically determining one or more menu selections to display based on the one or more manifest records.

10. The method of claim 1, wherein the docketing workflow further comprises instructions for filing a response in a pending patent case, paying a fee to a governmental agency, providing instructions to foreign counsel, or combinations thereof.

11. The method of claim 1, wherein the structured text indicates the electronic message is relaying a recent search report issued by a foreign patent office.

12. The method of claim 11, wherein the structured text further indicates that a response is due within six months of receipt of the search report.

13. The method of claim 1, wherein the reminder system comprises task lists, calendars, notifications, deadlines, or combinations thereof.

14. A method comprising:
   receiving an electronic communication comprising unstructured text in a body of the electronic communication, the unstructured text related to a docketing project;
   generating a manifest record including structured text associated with the electronic communication, wherein the structured text denotes one or more automated actions to be taken in an electronic docketing system related to the docketing-project;
   referencing the manifest record to generate a docketing workflow, the docketing workflow related to the docketing project;
      wherein the one or more automated actions to be executed by the automated electronic docketing system indicated by the structured text are encompassed in the docketing workflow, wherein the docketing workflow comprises instructions for identifying the related docketing project, creating a reminder system, and filing one or more documents;
   saving a copy of the manifest record locally;
   reading the manifest record to interpret the structured text; and
   automatically executing the docketing workflow in the electronic docketing system based on the manifest record.

15. The method of claim 14, wherein the electronic communication further comprises a document attached to the electronic communication.

16. The method of claim 15, further comprising saving a copy of the document, and reading the manifest record to determine a document type.

17. The method of claim 14, wherein automatically executing the docketing workflow in an electronic system based on the manifest record comprises at least one of:
- matching the manifest record to one or more stored templates and executing one or more actions based on those templates;
- moving one or more files within a database to one or more specified locations;
- adding the message to a database;
- updating a database;
- sending a new electronic communication;
- launching a computer program or application;
- scheduling a deadline for a one or more projects; and combinations thereof.

18. The method of claim 14, wherein the reminder system comprises task lists, calendars, notifications, deadlines, or combinations thereof.

19. A system comprising:
- an electronic communication system that receives an electronic communication with a manifest record attached, the electronic communication comprising unstructured text related to a-docketing project, the manifest record generated by analyzing the unstructured text and comprising structured text describing one or more automated actions to be taken in a docketing system upon receipt of the electronic communication, the one or more automated actions related to the docketing project;
- generates a docketing workflow by referencing the manifest record, the docketing workflow related to the docketing project;
- wherein the one or more automated actions to be executed by the automated electronic docketing system indicated by the structured text are encompassed in the docketing workflow, wherein the docketing workflow comprises instructions for identifying the related docketing project, creating a reminder system, and filing one or more documents; and
- an automated docketing system for interpreting the structured text in the manifest record and executing the docketing workflow related to the docketing project.

20. The system of claim 19, wherein the automated docketing system is fully or partially automated.

21. The system of claim 19, further comprising a database configured to receive the action executed by the automated docketing system.

22. The method of claim 19, wherein the reminder system comprises task lists, calendars, notifications, deadlines, or combinations thereof.

* * * * *